US011489431B2

(12) United States Patent
Donnellan et al.

(10) Patent No.: US 11,489,431 B2
(45) Date of Patent: Nov. 1, 2022

(54) TRANSPORT CLIMATE CONTROL SYSTEM POWER ARCHITECTURE

(71) Applicant: THERMO KING CORPORATION, Minneapolis, MN (US)

(72) Inventors: Wayne Donnellan, Oranmore (IE); Sean Keaveney, Galway (IE)

(73) Assignee: Thermo King Corporation, Minneapolis, MN (US)

(*) Notice: Subject to any disclaimer, the term of this patent is extended or adjusted under 35 U.S.C. 154(b) by 369 days.

(21) Appl. No.: 16/730,126

(22) Filed: Dec. 30, 2019

(65) Prior Publication Data

US 2021/0203217 A1 Jul. 1, 2021

(51) Int. Cl.
*F02D 25/00* (2006.01)
*F02B 67/06* (2006.01)
(Continued)

(52) U.S. Cl.
CPC .......... *H02K 47/14* (2013.01); *B60H 1/0075* (2013.01); *B60H 1/00421* (2013.01);
(Continued)

(58) Field of Classification Search
CPC .......... H02K 47/14; B60L 1/003; H02M 3/02; B60H 1/0075; B60H 1/3227;
(Continued)

(56) References Cited

U.S. PATENT DOCUMENTS 3,875,483 A 4/1975 Farr
5,104,037 A 4/1992 Karg et al.
(Continued)

FOREIGN PATENT DOCUMENTS

CN 2456117 10/2001
CN 1885660 12/2006
(Continued)

OTHER PUBLICATIONS

Extended European Search Report, issued in the corresponding European patent application No. 20210695.1, dated May 26, 2021, 7 pages.

(Continued)

*Primary Examiner* — Jared Fureman
*Assistant Examiner* — Esayas G Yeshaw
(74) *Attorney, Agent, or Firm* — Hamre, Schumann, Mueller & Larson, P.C.

(57) ABSTRACT

A transport climate control system is disclosed. The system includes a compressor, a motor-generator-rectifier machine, a belt drive connected to the motor-generator-rectifier machine and the compressor, at least one condenser fan, at least one evaporator fan, and a DC to DC converter. The motor-generator-rectifier machine connects to the at least one condenser fan, the at least one evaporator fan, and the DC to DC converter. The motor-generator-rectifier machine includes a motor, a low voltage generator connected to the motor, and a rectifier connected to the low voltage generator. The motor-generator-rectifier machine can provide a first low voltage DC power to the at least one condenser fan, the at least one evaporator fan, and the DC to DC converter. The DC to DC converter can convert the first low voltage DC power to a second low voltage DC power that is different from the first low voltage DC power.

19 Claims, 7 Drawing Sheets

(51) Int. Cl.
*H02K 47/14* (2006.01)
*B60H 1/00* (2006.01)
*B60H 1/32* (2006.01)
*F25D 11/00* (2006.01)
*H02M 3/02* (2006.01)
*B60L 1/00* (2006.01)

(52) U.S. Cl.
CPC ............ *B60H 1/3227* (2013.01); *B60L 1/003* (2013.01); *F25D 11/003* (2013.01); *H02M 3/02* (2013.01); *F25D 2400/32* (2013.01)

(58) Field of Classification Search
CPC ............ B60H 1/00421; B60H 1/00428; B60H 1/3232; F25D 11/003; F25D 2400/32; Y02T 10/88; H02J 1/082
See application file for complete search history.

(56) References Cited

U.S. PATENT DOCUMENTS

| | | | |
|---|---|---|---|
| 5,231,849 A | 8/1993 | Rosenblatt | |
| 6,280,320 B1 | 8/2001 | Paschke et al. | |
| 6,487,869 B1 | 12/2002 | Sulc et al. | |
| 6,518,727 B2 | 2/2003 | Oomura et al. | |
| 6,560,980 B2 | 5/2003 | Gustafson et al. | |
| 6,600,237 B1 | 7/2003 | Meissner | |
| 6,631,080 B2 | 10/2003 | Trimble et al. | |
| 6,652,330 B1 | 11/2003 | Wasilewski | |
| 6,688,125 B2 | 2/2004 | Okamoto et al. | |
| 6,753,692 B2 | 6/2004 | Toyomura et al. | |
| 6,925,826 B2 | 8/2005 | Hille et al. | |
| 7,011,902 B2 | 3/2006 | Pearson | |
| 7,120,539 B2 | 10/2006 | Krull et al. | |
| 7,122,923 B2 | 10/2006 | Lafontaine et al. | |
| 7,151,326 B2 | 12/2006 | Jordan | |
| 7,176,658 B2 | 2/2007 | Quazi et al. | |
| 7,206,692 B2 | 4/2007 | Beesley et al. | |
| 7,327,123 B2 | 2/2008 | Faberman et al. | |
| 7,424,343 B2 | 9/2008 | Kates | |
| 7,449,798 B2 | 11/2008 | Suzuki et al. | |
| 7,532,960 B2 | 5/2009 | Kumar | |
| 7,728,546 B2 | 6/2010 | Tanaka et al. | |
| 7,730,981 B2 | 6/2010 | McCabe et al. | |
| 7,745,953 B2 | 6/2010 | Puccetti et al. | |
| 7,806,796 B2 | 10/2010 | Zhu | |
| 7,830,117 B2 | 11/2010 | Ambrosio et al. | |
| 7,898,111 B1 | 3/2011 | Pistel | |
| 7,900,462 B2 | 3/2011 | Hegar et al. | |
| 8,020,651 B2 | 9/2011 | Zillmer et al. | |
| 8,030,880 B2 | 10/2011 | Alston et al. | |
| 8,134,339 B2 | 3/2012 | Burlak et al. | |
| 8,170,886 B2 | 5/2012 | Luff | |
| 8,214,141 B2 | 7/2012 | Froeberg | |
| 8,295,950 B1* | 10/2012 | Wordsworth | B60L 1/003 700/297 |
| 8,381,540 B2 | 2/2013 | Alston | |
| 8,441,228 B2 | 5/2013 | Brabec | |
| 8,476,872 B2 | 7/2013 | Truckenbrod et al. | |
| 8,487,458 B2 | 7/2013 | Steele et al. | |
| 8,541,905 B2 | 9/2013 | Brabec | |
| 8,602,141 B2 | 12/2013 | Yee et al. | |
| 8,626,367 B2 | 1/2014 | Krueger et al. | |
| 8,626,419 B2 | 1/2014 | Mitchell et al. | |
| 8,643,216 B2 | 2/2014 | Lattin | |
| 8,643,217 B2 | 2/2014 | Gietzold et al. | |
| 8,670,225 B2 | 3/2014 | Nunes | |
| 8,723,344 B1 | 5/2014 | Dierickx | |
| 8,742,620 B1 | 6/2014 | Brennan et al. | |
| 8,760,115 B2 | 6/2014 | Kinser et al. | |
| 8,764,469 B2 | 7/2014 | Lamb | |
| 8,767,379 B2 | 7/2014 | Whitaker | |
| 8,818,588 B2 | 8/2014 | Ambrosio et al. | |
| 8,862,356 B2 | 10/2014 | Miller | |
| 8,912,683 B2 | 12/2014 | Dames et al. | |
| 8,924,057 B2 | 12/2014 | Kinser et al. | |
| 8,978,798 B2 | 5/2015 | Dalum et al. | |
| 9,030,336 B2 | 5/2015 | Doyle | |
| 9,061,680 B2 | 6/2015 | Dalum | |
| 9,093,788 B2 | 7/2015 | Lamb | |
| 9,102,241 B2 | 8/2015 | Brabec | |
| 9,147,335 B2 | 9/2015 | Raghunathan et al. | |
| 9,199,543 B2 | 12/2015 | Brabec | |
| 9,313,616 B2 | 4/2016 | Mitchell et al. | |
| 9,436,853 B1 | 9/2016 | Meyers | |
| 9,440,507 B2 | 9/2016 | Giovanardi et al. | |
| 9,463,681 B2 | 10/2016 | Olaleye et al. | |
| 9,464,839 B2 | 10/2016 | Rusignuolo et al. | |
| 9,557,100 B2 | 1/2017 | Chopko et al. | |
| 9,562,715 B2 | 2/2017 | Kandasamy | |
| 9,694,697 B2 | 7/2017 | Brabec | |
| 9,738,160 B2 | 8/2017 | Bae et al. | |
| 9,758,013 B2 | 9/2017 | Steele | |
| 9,783,024 B2 | 10/2017 | Connell et al. | |
| 9,784,780 B2 | 10/2017 | Loftus et al. | |
| 9,825,549 B2 | 11/2017 | Choi et al. | |
| 9,846,086 B1 | 12/2017 | Robinson et al. | |
| 9,893,545 B2 | 2/2018 | Bean | |
| 9,931,960 B2 | 4/2018 | Tabatowski-Bush et al. | |
| 9,975,403 B2 | 5/2018 | Rusignuolo et al. | |
| 9,975,446 B2 | 5/2018 | Weber et al. | |
| 9,987,906 B2 | 6/2018 | Kennedy | |
| 10,000,122 B2 | 6/2018 | Wu et al. | |
| 10,148,212 B2 | 12/2018 | Schumacher et al. | |
| 10,240,847 B1 | 3/2019 | Thomas, Jr. | |
| 2002/0113576 A1 | 8/2002 | Oomura et al. | |
| 2003/0043607 A1 | 3/2003 | Vinciarelli et al. | |
| 2003/0106332 A1 | 6/2003 | Okamoto et al. | |
| 2003/0200017 A1 | 10/2003 | Capps et al. | |
| 2003/0201097 A1 | 10/2003 | Zeigler et al. | |
| 2005/0057210 A1 | 3/2005 | Ueda et al. | |
| 2005/0065684 A1 | 3/2005 | Larson et al. | |
| 2006/0061307 A1* | 3/2006 | Donnelly | B60L 7/22 318/108 |
| 2006/0284601 A1 | 12/2006 | Salasoo et al. | |
| 2007/0052241 A1 | 3/2007 | Pacy | |
| 2007/0130950 A1* | 6/2007 | Serkh | F02B 67/06 123/198 R |
| 2007/0192116 A1 | 8/2007 | Levitt | |
| 2008/0177678 A1 | 7/2008 | Di Martini et al. | |
| 2008/0281473 A1 | 11/2008 | Pitt | |
| 2009/0121798 A1 | 5/2009 | Levinson | |
| 2009/0122901 A1 | 5/2009 | Choi et al. | |
| 2009/0126901 A1 | 5/2009 | Hegar et al. | |
| 2009/0178424 A1 | 7/2009 | Hwang et al. | |
| 2009/0195349 A1 | 8/2009 | Frader-Thompson et al. | |
| 2009/0228155 A1 | 9/2009 | Slifkin et al. | |
| 2009/0314019 A1 | 12/2009 | Fujimoto et al. | |
| 2009/0320515 A1 | 12/2009 | Bischofberger et al. | |
| 2010/0045105 A1 | 2/2010 | Bovio et al. | |
| 2010/0230224 A1 | 9/2010 | Hindman | |
| 2010/0312425 A1 | 12/2010 | Obayashi et al. | |
| 2010/0320018 A1 | 12/2010 | Gwozdek et al. | |
| 2011/0000244 A1 | 1/2011 | Reason et al. | |
| 2011/0114398 A1 | 5/2011 | Bianco | |
| 2011/0118916 A1 | 5/2011 | Gullichsen | |
| 2011/0162395 A1 | 7/2011 | Chakiachvili et al. | |
| 2011/0208378 A1 | 8/2011 | Krueger et al. | |
| 2011/0224841 A1 | 9/2011 | Profitt-Brown et al. | |
| 2011/0241420 A1 | 10/2011 | Hering et al. | |
| 2011/0290893 A1 | 12/2011 | Steinberg | |
| 2012/0000212 A1 | 1/2012 | Sanders et al. | |
| 2012/0116931 A1 | 5/2012 | Meyers | |
| 2012/0153722 A1 | 6/2012 | Nazarian | |
| 2012/0198866 A1 | 8/2012 | Zeidner | |
| 2012/0310376 A1 | 12/2012 | Krumm et al. | |
| 2012/0310416 A1 | 12/2012 | Tepper et al. | |
| 2013/0000342 A1 | 1/2013 | Blasko et al. | |
| 2013/0073094 A1 | 3/2013 | Knapton et al. | |
| 2013/0088900 A1 | 4/2013 | Park | |
| 2013/0158828 A1 | 6/2013 | McAlister | |
| 2013/0231808 A1 | 9/2013 | Flath et al. | |
| 2014/0018969 A1 | 1/2014 | Forbes, Jr. | |
| 2014/0020414 A1 | 1/2014 | Rusignuolo et al. | |

(56) References Cited

U.S. PATENT DOCUMENTS

| | | |
|---|---|---|
| 2014/0026599 A1 | 1/2014 | Rusignuolo et al. |
| 2014/0060097 A1 | 3/2014 | Perreault |
| 2014/0137590 A1 | 5/2014 | Chopko et al. |
| 2014/0230470 A1 | 8/2014 | Cook |
| 2014/0265560 A1 | 9/2014 | Leehey et al. |
| 2015/0019132 A1 | 1/2015 | Gusikhin et al. |
| 2015/0081212 A1 | 3/2015 | Mitchell et al. |
| 2015/0121923 A1 | 5/2015 | Rusignuolo et al. |
| 2015/0168032 A1 | 6/2015 | Steele |
| 2015/0188360 A1 | 7/2015 | Doane et al. |
| 2015/0306937 A1 | 10/2015 | Kitamura et al. |
| 2015/0316301 A1 | 11/2015 | Kolda et al. |
| 2015/0345958 A1 | 12/2015 | Graham |
| 2015/0355288 A1 | 12/2015 | Yokoyama et al. |
| 2015/0360568 A1* | 12/2015 | Champagne .......... B60R 16/033 296/156 |
| 2016/0011001 A1 | 1/2016 | Emory et al. |
| 2016/0035152 A1 | 2/2016 | Kargupta |
| 2016/0089994 A1 | 3/2016 | Keller et al. |
| 2016/0144764 A1 | 5/2016 | Dutta et al. |
| 2016/0252289 A1 | 9/2016 | Feng et al. |
| 2016/0280040 A1 | 9/2016 | Connell et al. |
| 2016/0285416 A1 | 9/2016 | Tiwari et al. |
| 2016/0291622 A1 | 10/2016 | Al-Mohssen et al. |
| 2016/0327921 A1 | 11/2016 | Ribbich et al. |
| 2016/0377309 A1 | 12/2016 | Abiprojo et al. |
| 2017/0030728 A1 | 2/2017 | Baglino et al. |
| 2017/0057323 A1 | 3/2017 | Neu et al. |
| 2017/0063248 A1 | 3/2017 | Lee et al. |
| 2017/0098954 A1 | 4/2017 | Ferguson et al. |
| 2017/0217280 A1 | 8/2017 | Larson et al. |
| 2017/0259764 A1 | 9/2017 | Da Silva Carvalho et al. |
| 2017/0302200 A1 | 10/2017 | Marcinkiewicz |
| 2017/0349078 A1 | 12/2017 | Dziuba et al. |
| 2018/0022187 A1 | 1/2018 | Connell et al. |
| 2018/0029436 A1 | 2/2018 | Zaeri et al. |
| 2018/0029488 A1 | 2/2018 | Sjodin |
| 2018/0087813 A1 | 3/2018 | Sent, Jr. |
| 2018/0111441 A1 | 4/2018 | Menard et al. |
| 2018/0154723 A1 | 6/2018 | Anderson et al. |
| 2018/0201092 A1 | 7/2018 | Ahuja et al. |
| 2018/0203443 A1 | 7/2018 | Newman |
| 2018/0222278 A1 | 8/2018 | Mizuma |
| 2018/0306533 A1 | 10/2018 | Alahyari et al. |
| 2018/0334012 A1 | 11/2018 | Geller et al. |
| 2018/0342876 A1 | 11/2018 | Agnew et al. |
| 2018/0342877 A1 | 11/2018 | Yoo et al. |
| 2018/0356870 A1 | 12/2018 | Rusignuolo |
| 2019/0047496 A1 | 2/2019 | Sufrin-Disler et al. |
| 2019/0086138 A1 | 3/2019 | Chopko et al. |
| 2019/0092122 A1 | 3/2019 | Vanous et al. |
| 2019/0123544 A1 | 4/2019 | Pelegris et al. |
| 2019/0184838 A1 | 6/2019 | Lee et al. |
| 2019/0255914 A1 | 8/2019 | Ikeda et al. |
| 2019/0283541 A1 | 9/2019 | Adetola et al. |
| 2019/0308487 A1 | 10/2019 | Badger, II et al. |
| 2020/0050753 A1 | 2/2020 | Davis et al. |
| 2020/0076029 A1 | 3/2020 | Litz |
| 2020/0086744 A1 | 3/2020 | Schumacher et al. |
| 2020/0101820 A1 | 4/2020 | Wenger et al. |
| 2020/0130471 A1 | 4/2020 | Leasure |
| 2020/0130473 A1 | 4/2020 | Schumacher et al. |
| 2020/0136504 A1 | 4/2020 | Schumacher et al. |
| 2020/0207184 A1 | 7/2020 | Schumacher et al. |

FOREIGN PATENT DOCUMENTS

| | | |
|---|---|---|
| CN | 2912069 | 6/2007 |
| CN | 101713577 | 5/2010 |
| CN | 202038315 | 11/2011 |
| CN | 104539184 | 4/2015 |
| CN | 104734178 | 6/2015 |
| CN | 105711376 | 6/2016 |
| CN | 106184252 | 12/2016 |
| CN | 106766419 | 5/2017 |
| CN | 106774131 | 5/2017 |
| CN | 108074466 | 5/2018 |
| CN | 108931006 | 12/2018 |
| CN | 208306320 | 1/2019 |
| CN | 208650989 | 3/2019 |
| DE | 3817365 | 11/1989 |
| DE | 29715576 | 12/1997 |
| DE | 10138750 | 2/2003 |
| DE | 10200637 | 10/2003 |
| DE | 102011050719 | 12/2012 |
| EP | 0282051 | 9/1988 |
| EP | 1935712 | 6/2008 |
| EP | 2365915 | 9/2011 |
| EP | 2689944 | 1/2014 |
| EP | 2717016 | 9/2014 |
| EP | 2942216 | 11/2015 |
| EP | 3343728 | 7/2018 |
| EP | 536552 | 9/2019 |
| EP | 3540340 | 9/2019 |
| GB | 2551999 | 1/2018 |
| JP | 2000158930 | 6/2000 |
| JP | 2007320352 | 12/2007 |
| JP | 2009243780 | 10/2009 |
| JP | 2019145521 | 8/2019 |
| KR | 10-2012-0092834 | 8/2012 |
| WO | 03038988 | 5/2003 |
| WO | 2008/094148 | 8/2008 |
| WO | 2008/153518 | 12/2008 |
| WO | 2009/155941 | 12/2009 |
| WO | 2010065476 | 6/2010 |
| WO | 2011066468 | 6/2011 |
| WO | 2012/138500 | 10/2012 |
| WO | 2012138497 | 10/2012 |
| WO | 2013096084 | 6/2013 |
| WO | 2014002244 | 1/2014 |
| WO | 2014058610 | 4/2014 |
| WO | 2014085672 | 6/2014 |
| WO | 2014106060 | 7/2014 |
| WO | 2014106068 | 7/2014 |
| WO | 2015/100398 | 7/2015 |
| WO | 2016/038838 | 3/2016 |
| WO | 2016145107 | 9/2016 |
| WO | 2017058660 | 4/2017 |
| WO | 2017/083333 | 5/2017 |
| WO | 2017/083336 | 5/2017 |
| WO | 2017/151698 | 9/2017 |
| WO | 2017172484 | 10/2017 |
| WO | 2017172855 | 10/2017 |
| WO | 2017176682 | 10/2017 |
| WO | 2017176725 | 10/2017 |
| WO | 2017176729 | 10/2017 |
| WO | 2017189485 | 11/2017 |
| WO | 2017218909 | 12/2017 |
| WO | 2017218910 | 12/2017 |
| WO | 2017218912 | 12/2017 |
| WO | 2018/017450 | 1/2018 |
| WO | 2018009646 | 1/2018 |
| WO | 2018009798 | 1/2018 |
| WO | 2018017818 | 1/2018 |
| WO | 2018029502 | 2/2018 |
| WO | 2018/136738 | 7/2018 |
| WO | 2018226389 | 12/2018 |
| WO | 2018226649 | 12/2018 |
| WO | 2018226848 | 12/2018 |
| WO | 2018226857 | 12/2018 |
| WO | 2018226862 | 12/2018 |
| WO | 2018226906 | 12/2018 |
| WO | 2018226981 | 12/2018 |
| WO | 2018226986 | 12/2018 |
| WO | 2019051086 | 3/2019 |
| WO | 2019151947 | 8/2019 |
| WO | 2020068446 | 4/2020 |
| WO | 2020068450 | 4/2020 |
| WO | 2020068469 | 4/2020 |
| WO | 2020068475 | 4/2020 |
| WO | 2020068502 | 4/2020 |
| WO | 2020068556 | 4/2020 |

(56) References Cited

FOREIGN PATENT DOCUMENTS

| WO | 2020068641 | 4/2020 |
|---|---|---|
| WO | 2020068646 | 4/2020 |
| WO | 2020069107 | 4/2020 |

OTHER PUBLICATIONS

Yang et al., "The Role of Thermal Plume in Person-to-Person Contaminant Cross Transmission", 2017 Winter Conference, Seminar 36; Modeling and Control of the Personal Microenvironment, 5 pages.

"Lamberet Smart Reefer on Solutrans", Zoeken, Jul. 28, 2015, 7 pages, available at: https://iepieleaks.nl/lamberet-smart-reefer-solutrans/.

U.S. Appl. No. 16/178,067, titled "Methods and Systems for Generation and Utilization of Supplemental Stored Energy for Use in Transport Climate Control", filed Nov. 1, 2018, 35 pages.

U.S. Appl. No. 16/565,063, titled "System and Method for Managing Power and Efficiently Sourcing a Variable Voltage for a Transport Climate Control System ", filed Sep. 9, 2019, 59 pages.

U.S. Appl. No. 16/574,754, titled "Methods and Systems for Energy Management of a Transport Climate Control System", filed Sep. 18, 2019, 50 pages.

U.S. Appl. No. 16/574,775, titled "Methods and Systems for Power and Load Management of a Transport Climate Control System", filed Sep. 18, 2019, 68 pages.

European Patent Application No. 18382672.6, titled "Methods and Systems for Energy Management of a Transport Climate Control System", filed Sep. 19, 2018, 50 pages.

European Patent Application No. 18382673.4 titled "Methods and Systems for Power and Load Management of a Transport Climate Control System", filed Sep. 19, 2018, 68 pages.

U.S. Appl. No. 16/176,802, titled "Methods and Systems for Controlling a Mild Hybrid System That Powers a Transport Climate Control System", filed Oct. 31, 2018, 31 pages.

U.S. Appl. No. 16/236,938, titled "Systems and Methods for Smart Load Shedding of a Transport Vehicle While in Transit", filed Dec. 31, 2018, 39 pages.

U.S. Appl. No. 16/176,720, titled "Methods and Systems for Augmenting a Vehicle Powered Transport Climate Control System", filed Oct. 31, 2018, 41 pages.

U.S. Appl. No. 16/176,602, titled "Reconfigurable Utility Power Input With Passive Voltage Booster", filed Oct. 31, 2018, 39 pages.

U.S. Appl. No. 16/147,704, titled "Methods and Systems for Monitoring and Displaying Energy Use and Energy Cost of a Transport Vehicle Climate Control System or a Fleet of Transport Vehicle Climate Control Systems", filed Sep. 29, 2018, 33 pages.

U.S. Appl. No. 16/235,865, titled "Methods and Systems for Preserving Autonomous Operation of a Transport Climate Control System", filed Dec. 28, 2018, 41 pages.

PCT International Application No. PCT/US2018/068136, titled "Methods and Systems for Providing Predictive Energy Consumption Feedback for Powering a Transport Climate Control System", filed Dec. 31, 2018, 34 pages.

PCT International Application No. PCT/US2018/068129, titled "Methods and Systems for Notifying and Mitigating a Suboptimal Event Occurring in a Transport Climate Control System", filed Dec. 31, 2018, 44 pages.

PCT International Application No. PCT/US2018/068139, titled "Methods and Systems for Providing Feedback for a Transport Climate Control System", filed Dec. 31, 2018, 37 pages.

PCT International Application No. PCT/US2018/068142, titled "Methods and Systems for Providing Predictive Energy Consumption Feedback for Powering a Transport Climate Control System Using External Data", filed Dec. 31, 2018, 39 pages.

U.S. Appl. No. 16/911,692, titled "Climate Controlled Vehicle, Transport Climate Control Equipment, Method of Retrofitting a Vehicle and Method of Operation", filed Jun. 25, 2020, 39 pages.

U.S. Appl. No. 16/565,110, titled "Transport Climate Control System With a Selfconfiguring Matrix Power Converter", filed Sep. 9, 2019, 52 pages.

U.S. Appl. No. 16/565,146, titled "Optimized Power Management for a Transport Climate Control Energy Source", filed Sep. 9, 2019, 53 pages.

U.S. Appl. No. 62/897,833, titled "Optimized Power Distribution To Transport Climate Control Systems Amongst One or More Electric Supply Equipment Stations ", filed Sep. 9, 2019, 41 pages.

European Patent Application No. 19382776.3, titled "Mprioritized Power Delivery for Facilitating Transport Climate Control", filed Sep. 9, 2019, 41 pages.

U.S. Appl. No. 16/565,282, titled "Optimized Power Cord for Transferring Power To a Transport Climate Control System ", filed Sep. 9, 2019, 43 pages.

U.S. Appl. No. 16/565,235, titled "Interface System for Connecting a Vehicle and a Transport Climate Control System", filed Sep. 9, 2019, 64 pages.

U.S. Appl. No. 16/565,205, titled "Transport Climate Control System With an Accessory Power Distribution Unit for Managing Transport Climate Control Loads", filed Sep. 9, 2019, 57 pages.

U.S. Appl. No. 17/015,190, titled "Optimized Power Distribution To Transport Climate Control Systems Amongst One or More Electric Supply Equipment Stations ", filed Sep. 9, 2020, 43 pages.

U.S. Appl. No. 16/147,708, titled "Methods and Systems for Autonomous Climate Control Optimization of a Transport Vehicle", filed Sep. 29, 2018, 41 pages.

U.S. Appl. No. 16/176,667, titled "Drive Off Protection System and Method for Preventing Drive Off", filed Oct. 31, 2018, 41 pages.

U.S. Appl. No. 16/565,252, titled "Demand-Side Power Distribution Management For a Plurality of Transport Climate Control Systems", filed Sep. 9, 2019, 44 pages.

U.S. Appl. No. 17/015,194, titled "Prioritized Power Delivery for Facilitating Transport Climate Control", filed Sep. 9, 2020, 41 pages.

* cited by examiner

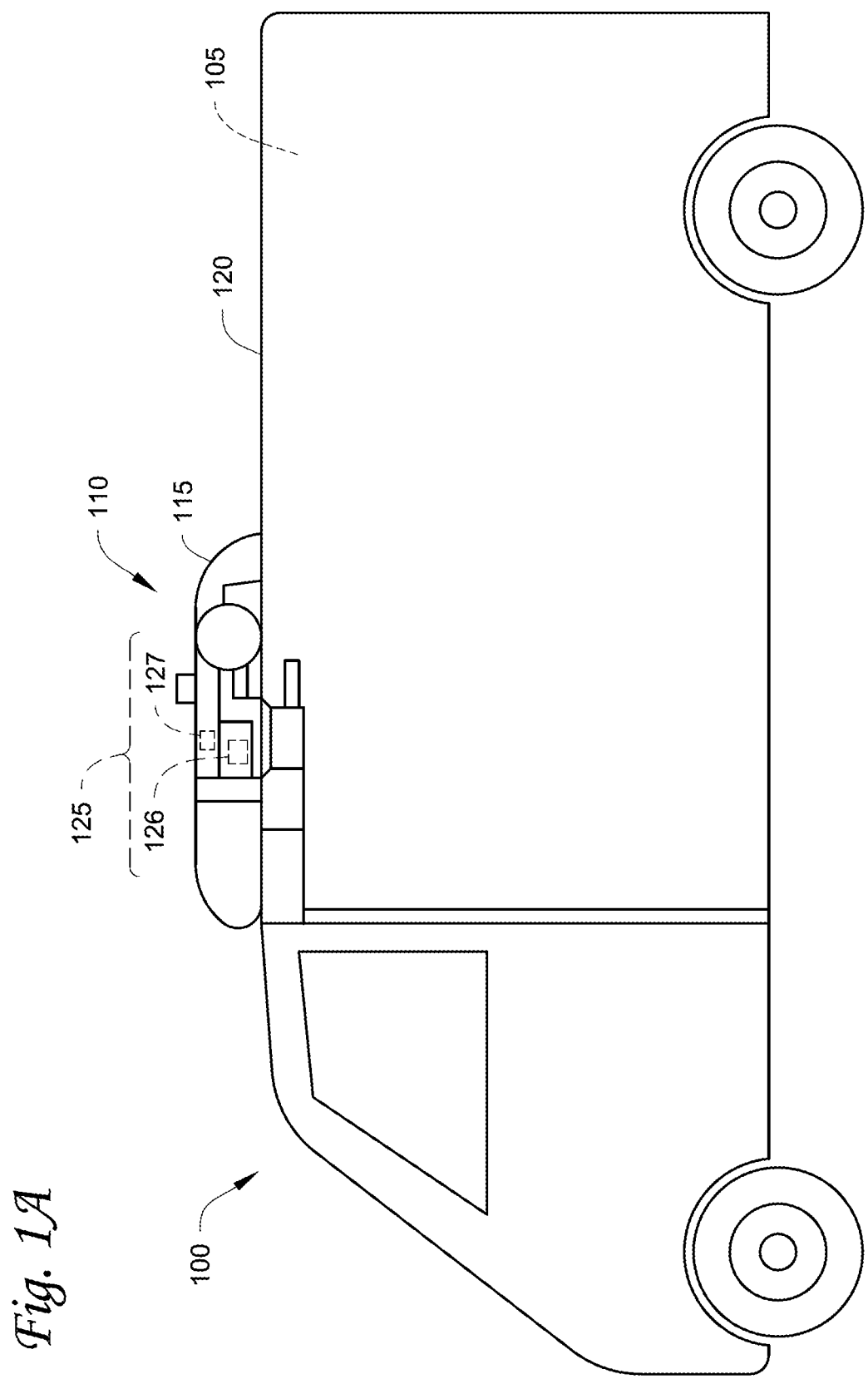

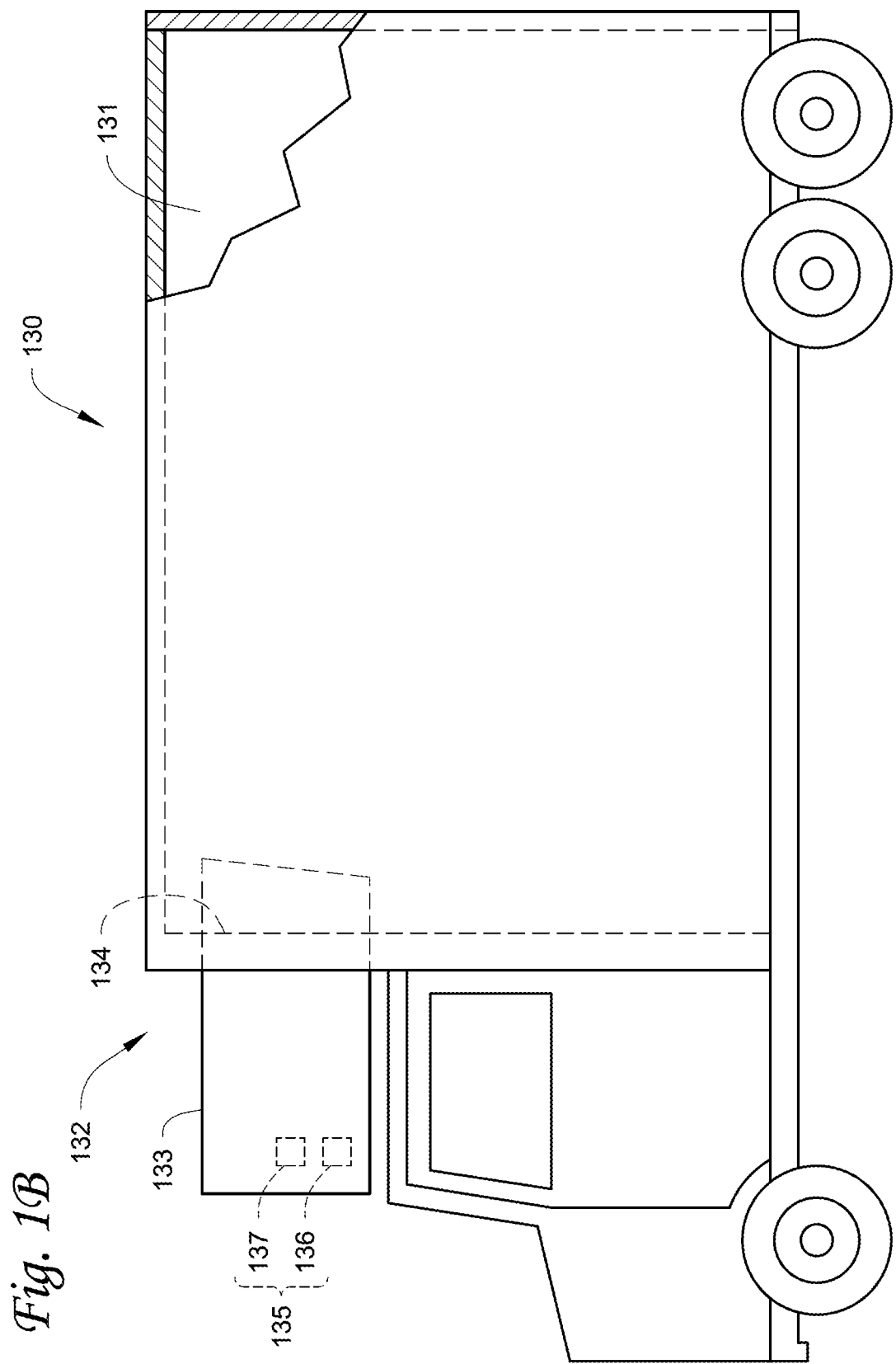

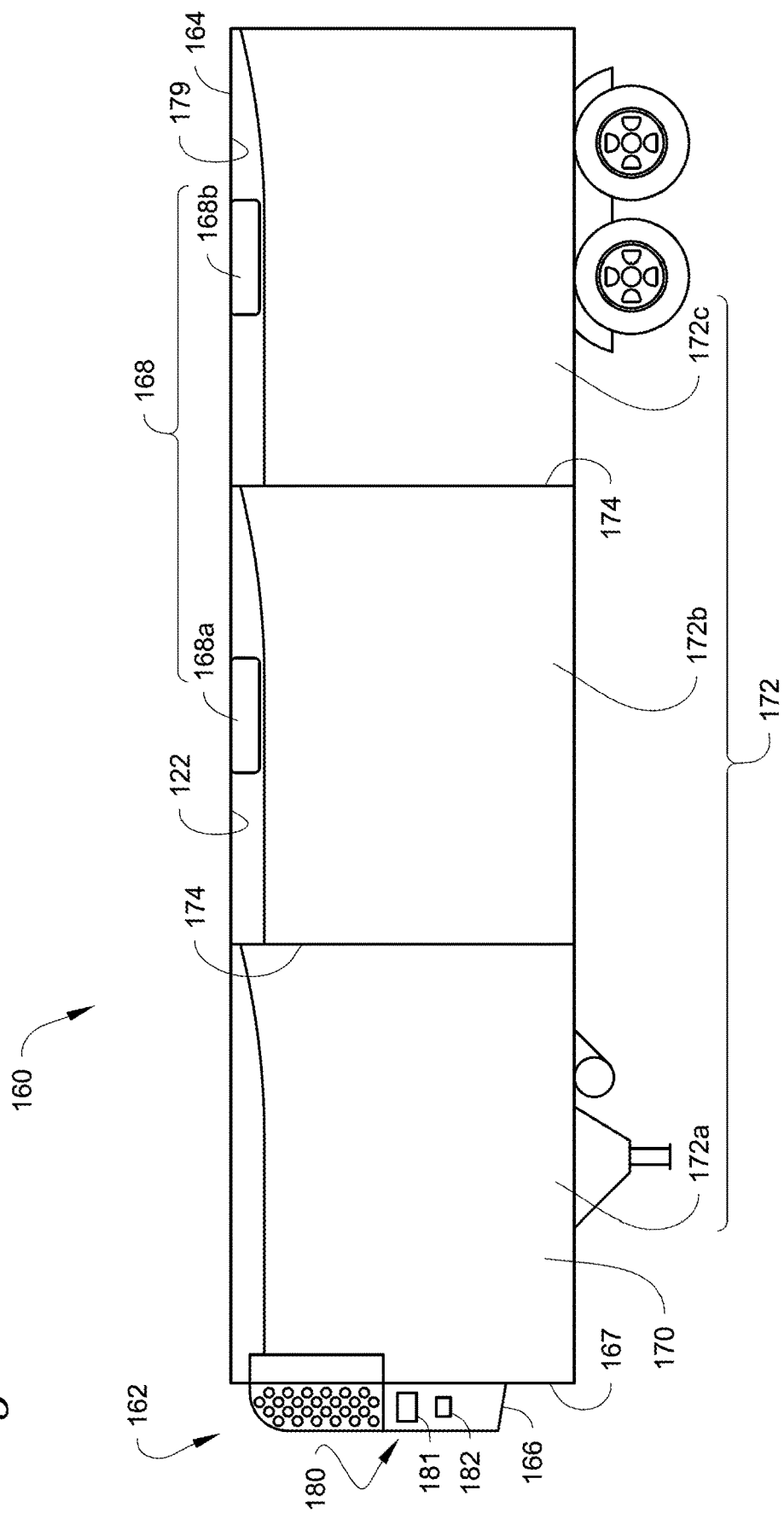

TRANSPORT CLIMATE CONTROL SYSTEM POWER ARCHITECTURE

FIELD

The disclosure herein relates to a power architecture for providing energy to a transport climate control system.

BACKGROUND

A transport climate control system is generally used to control environmental condition(s) (e.g., temperature, humidity, air quality, and the like) within a climate controlled space of a transport unit (e.g., a truck, a container (such as a container on a flat car, an intermodal container, etc.), a box car, a semi-tractor, a bus, or other similar transport unit). The transport climate control system can include, for example, a transport refrigeration system (TRS) and/or a heating, ventilation and air conditioning (HVAC) system. The TRS can control environmental condition(s) within the climate controlled space to maintain cargo (e.g., produce, frozen foods, pharmaceuticals, etc.). The HVAC system can control environmental conditions(s) within the climate controlled space to provide passenger comfort for passengers travelling in the transport unit. In some transport units, the transport climate control system can be installed externally (e.g., on a rooftop of the transport unit, on a front wall of the transport unit, etc.).

SUMMARY

The disclosure herein relates to a power architecture for providing energy to a transport climate control system.

In some embodiments, a transport climate control system is provided with a diesel engine as a prime mover driving a motor-generator-rectifier machine via a belt drive to provide a low voltage DC power to drive low voltage DC components such as low voltage DC condenser fan(s) and/or evaporator fan(s).

The embodiments described herein are directed to a transport climate control system that includes condenser fan(s) and/or evaporator fan(s) that are electrically driven variable speed DC fan(s). Accordingly, the embodiments described herein can provide flexibility in the sizing and positioning of the condenser fan(s) and/or the evaporator fan(s). The embodiments described herein can also provide flexibility in the sizing and positioning of the condenser coil and/or the evaporator coil. The embodiments described herein can also facilitate variable condenser fan(s) and/or evaporator fan(s) which can optimize performance of the transport climate control system throughout is full operating range while also allowing a user to control a desired airflow within the climate controlled space of the transport unit. Accordingly, the embodiments described herein can reduce energy consumption and reduced total cost of ownership versus a conventional transport climate control system that has condenser fan(s) and/or evaporator fan(s) powered via a mechanical transmission (e.g. belt drive or gear drive).

In one embodiment, a transport climate control system is disclosed. The transport climate control system includes a compressor, a motor-generator-rectifier machine, a belt drive connected to the motor-generator-rectifier machine and the compressor, at least one condenser fan, at least one evaporator fan, and a DC to DC converter. The motor-generator-rectifier machine connects to the at least one condenser fan, the at least one evaporator fan, and the DC to DC converter. The motor-generator-rectifier machine includes a motor, a low voltage generator connected to the motor, and a rectifier connected to the low voltage generator. The motor-generator-rectifier machine is configured to provide a first low voltage DC power to the at least one condenser fan, the at least one evaporator fan, and the DC to DC converter. The DC to DC converter is configured to convert the first low voltage DC power to a second low voltage DC power that is different from the first low voltage DC power.

In one embodiment, a method for distributing power for a transport climate control system is disclosed. The method includes distributing power to a motor-generator-rectifier machine. The motor-generator-rectifier machine includes a motor, a low voltage generator, and a rectifier. The method also includes the motor-generator-rectifier machine generating a first low voltage DC power to drive at least one condenser fan, at least one evaporator fan, and a DC to DC converter. The method further includes the DC to DC converter converting the first low voltage DC power to a second low voltage DC power that is different from the first low voltage DC power.

BRIEF DESCRIPTION OF THE DRAWINGS

References are made to the accompanying drawings that form a part of this disclosure and which illustrate embodiments in which the systems and methods described in this specification can be practiced.

FIG. 1A illustrates a side view of a van with a transport climate control system, according to one embodiment.

FIG. 1B illustrates a side view of a truck with a transport climate control system, according to one embodiment.

FIG. 1D illustrates a side view of a climate controlled transport unit with a multi-zone transport climate control system, according to one embodiment.

Like reference numbers represent like parts throughout.

DETAILED DESCRIPTIONS

Figure 1C:
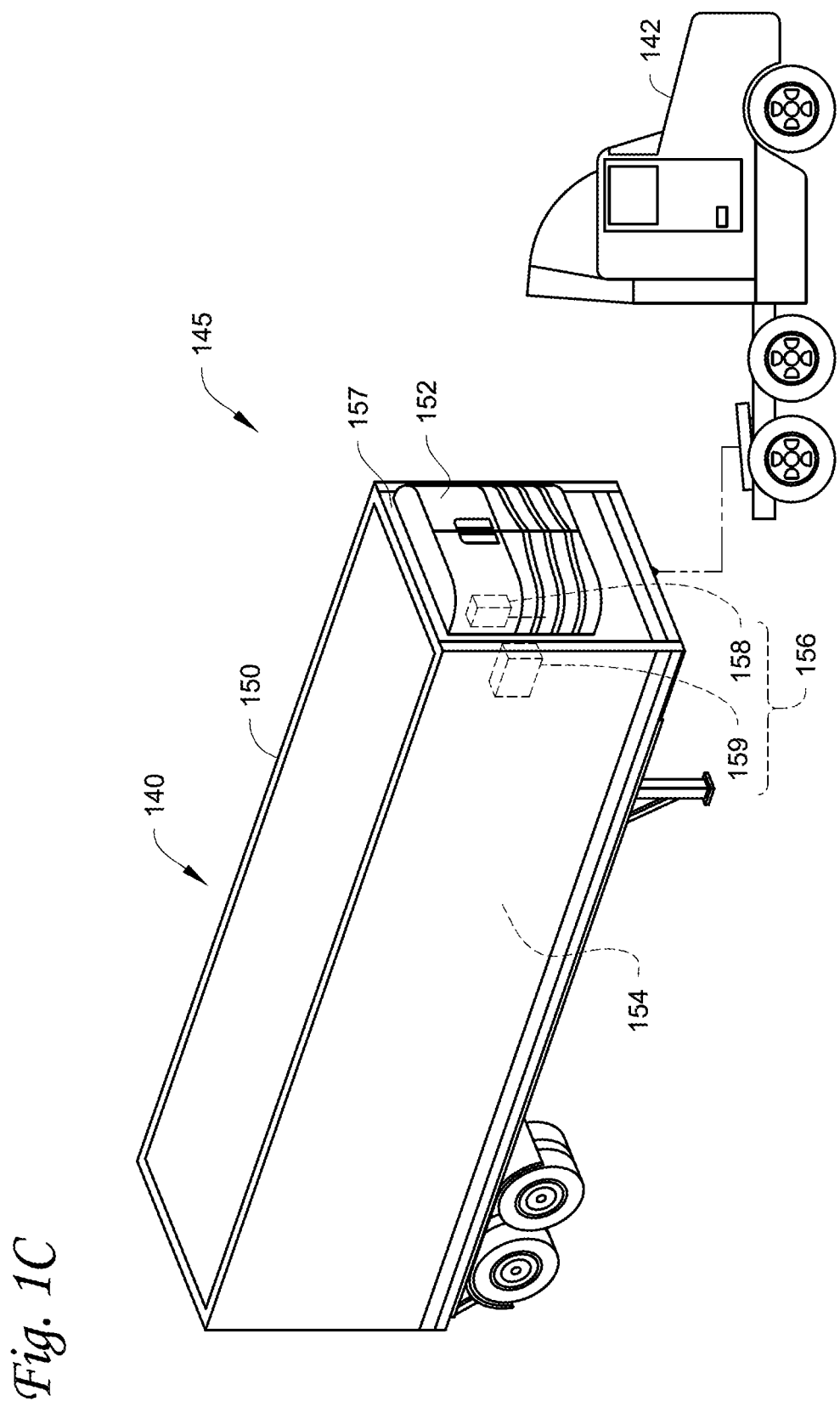
FIG. 1C illustrates a perspective view of a climate controlled transport unit, with a transport climate control system, attached to a tractor, according to one embodiment.

The disclosure herein relates to an electrical architecture for a transport climate control system.

In some embodiments, a transport climate control system is provided with a diesel engine as a prime mover driving a motor-generator-rectifier machine via a belt drive to provide a low voltage DC power to drive low voltage DC components such as low voltage DC condenser fan(s) and/or evaporator fan(s).

As defined herein, "low voltage" refers to Class A of the ISO 6469-3 in the automotive environment. In particular, "low voltage" refers to a maximum working voltage of between 0V and 60V DC or between 0V and 30V AC. E.g., a low voltage can be 12 VDC, 24 VDC, 48 VDC, or other suitable DC voltage.

As defined herein, "high voltage" refers to Class B of the ISO 6469-3 in the automotive environment. In particular, "high voltage" refers to a maximum working voltage of between 60V and 1500V DC or between 30V and 1000V AC. E.g., a high voltage can be 350 VDC, 400 VDC, 700 VDC, 800 VDC or other suitable DC voltage.

FIG. 1A depicts a climate-controlled van 100 that includes a climate controlled space 105 for carrying cargo and a transport climate control system 110 for providing climate control within the climate controlled space 105. The transport climate control system 110 includes a climate control unit (CCU) 115 that is mounted to a rooftop 120 of the van 100. The transport climate control system 110 can include, amongst other components, a climate control circuit (see FIG. 2) that connects, for example, a compressor, a condenser, an evaporator and an expansion device to provide climate control within the climate controlled space 105. It will be appreciated that the embodiments described herein are not limited to climate-controlled vans, but can apply to any type of transport unit (e.g., a truck, a container (such as a container on a flat car, an intermodal container, a marine container, etc.), a box car, a semi-tractor, a bus, or other similar transport unit), etc.

The transport climate control system 110 also includes a programmable climate controller 125 and one or more sensors (not shown) that are configured to measure one or more parameters of the transport climate control system 110 (e.g., an ambient temperature outside of the van 100, an ambient humidity outside of the van 100, a compressor suction pressure, a compressor discharge pressure, a supply air temperature of air supplied by the CCU 115 into the climate controlled space 105, a return air temperature of air returned from the climate controlled space 105 back to the CCU 115, a humidity within the climate controlled space 105, etc.) and communicate parameter data to the climate controller 125. The climate controller 125 is configured to control operation of the transport climate control system 110 including the components of the climate control circuit. The climate controller unit 115 may comprise a single integrated control unit 126 or may comprise a distributed network of climate controller elements 126, 127. The number of distributed control elements in a given network can depend upon the particular application of the principles described herein.

FIG. 1B depicts a climate-controlled straight truck 130 that includes a climate controlled space 131 for carrying cargo and a transport climate control system 132. The transport climate control system 132 includes a CCU 133 that is mounted to a front wall 134 of the climate controlled space 131. The CCU 133 can include, amongst other components, a climate control circuit (see FIG. 2) that connects, for example, a compressor, a condenser, an evaporator and an expansion device to provide climate control within the climate controlled space 131.

The transport climate control system 132 also includes a programmable climate controller 135 and one or more sensors (not shown) that are configured to measure one or more parameters of the transport climate control system 132 (e.g., an ambient temperature outside of the truck 130, an ambient humidity outside of the truck 130, a compressor suction pressure, a compressor discharge pressure, a supply air temperature of air supplied by the CCU 133 into the climate controlled space 131, a return air temperature of air returned from the climate controlled space 131 back to the CCU 133, a humidity within the climate controlled space 131, etc.) and communicate parameter data to the climate controller 135. The climate controller 135 is configured to control operation of the transport climate control system 132 including components of the climate control circuit. The climate controller 135 may comprise a single integrated control unit 136 or may comprise a distributed network of climate controller elements 136, 137. The number of distributed control elements in a given network can depend upon the particular application of the principles described herein.

FIG. 1C illustrates one embodiment of a climate controlled transport unit 140 attached to a tractor 142. The climate controlled transport unit 140 includes a transport climate control system 145 for a transport unit 150. The tractor 142 is attached to and is configured to tow the transport unit 150. The transport unit 150 shown in FIG. 1C is a trailer.

The transport climate control system 145 includes a CCU 152 that provides environmental control (e.g. temperature, humidity, air quality, etc.) within a climate controlled space 154 of the transport unit 150. The CCU 152 is disposed on a front wall 157 of the transport unit 150. In other embodiments, it will be appreciated that the CCU 152 can be disposed, for example, on a rooftop or another wall of the transport unit 150. The CCU 152 includes a climate control circuit (see FIG. 2) that connects, for example, a compressor, a condenser, an evaporator and an expansion device to provide conditioned air within the climate controlled space 154.

The transport climate control system 145 also includes a programmable climate controller 156 and one or more sensors (not shown) that are configured to measure one or more parameters of the transport climate control system 145 (e.g., an ambient temperature outside of the transport unit 150, an ambient humidity outside of the transport unit 150, a compressor suction pressure, a compressor discharge pressure, a supply air temperature of air supplied by the CCU 152 into the climate controlled space 154, a return air temperature of air returned from the climate controlled space 154 back to the CCU 152, a humidity within the climate controlled space 154, etc.) and communicate parameter data to the climate controller 156. The climate controller 156 is configured to control operation of the transport climate control system 145 including components of the climate control circuit. The climate controller 156 may comprise a single integrated control unit 158 or may comprise a distributed network of climate controller elements 158, 159. The number of distributed control elements in a given network can depend upon the particular application of the principles described herein.

FIG. 1D illustrates another embodiment of a climate controlled transport unit 160. The climate controlled transport unit 160 includes a multi-zone transport climate control system (MTCS) 162 for a transport unit 164 that can be towed, for example, by a tractor (not shown). It will be appreciated that the embodiments described herein are not limited to tractor and trailer units, but can apply to any type of transport unit (e.g., a truck, a container (such as a container on a flat car, an intermodal container, a marine container, etc.), a box car, a semi-tractor, a bus, or other similar transport unit), etc.

The MTCS 162 includes a CCU 166 and a plurality of remote units 168 that provide environmental control (e.g. temperature, humidity, air quality, etc.) within a climate controlled space 170 of the transport unit 164. The climate controlled space 170 can be divided into a plurality of zones 172. The term "zone" means a part of an area of the climate controlled space 170 separated by walls 174. The CCU 166 can operate as a host unit and provide climate control within a first zone 172a of the climate controlled space 166. The remote unit 168a can provide climate control within a second zone 172b of the climate controlled space 170. The remote unit 168b can provide climate control within a third zone 172c of the climate controlled space 170. Accordingly, the MTCS 162 can be used to separately and independently control environmental condition(s) within each of the multiple zones 172 of the climate controlled space 162.

The CCU 166 is disposed on a front wall 167 of the transport unit 160. In other embodiments, it will be appreciated that the CCU 166 can be disposed, for example, on a rooftop or another wall of the transport unit 160. The CCU 166 includes a climate control circuit (see FIG. 2) that connects, for example, a compressor, a condenser, an evaporator and an expansion device to provide conditioned air within the climate controlled space 170. The remote unit 168a is disposed on a ceiling 179 within the second zone 172b and the remote unit 168b is disposed on the ceiling 179 within the third zone 172c. Each of the remote units 168a, 168b include an evaporator (not shown) that connects to the rest of the climate control circuit provided in the CCU 166.

The MTCS 162 also includes a programmable climate controller 180 and one or more sensors (not shown) that are configured to measure one or more parameters of the MTCS 162 (e.g., an ambient temperature outside of the transport unit 164, an ambient humidity outside of the transport unit 164, a compressor suction pressure, a compressor discharge pressure, supply air temperatures of air supplied by the CCU 166 and the remote units 168 into each of the zones 172, return air temperatures of air returned from each of the zones 172 back to the respective CCU 166 or remote unit 168a or 168b, a humidity within each of the zones 118, etc.) and communicate parameter data to a climate controller 180. The climate controller 180 is configured to control operation of the MTCS 162 including components of the climate control circuit. The climate controller 180 may comprise a single integrated control unit 181 or may comprise a distributed network of climate controller elements 181, 182. The number of distributed control elements in a given network can depend upon the particular application of the principles described herein.

Figure 1E:
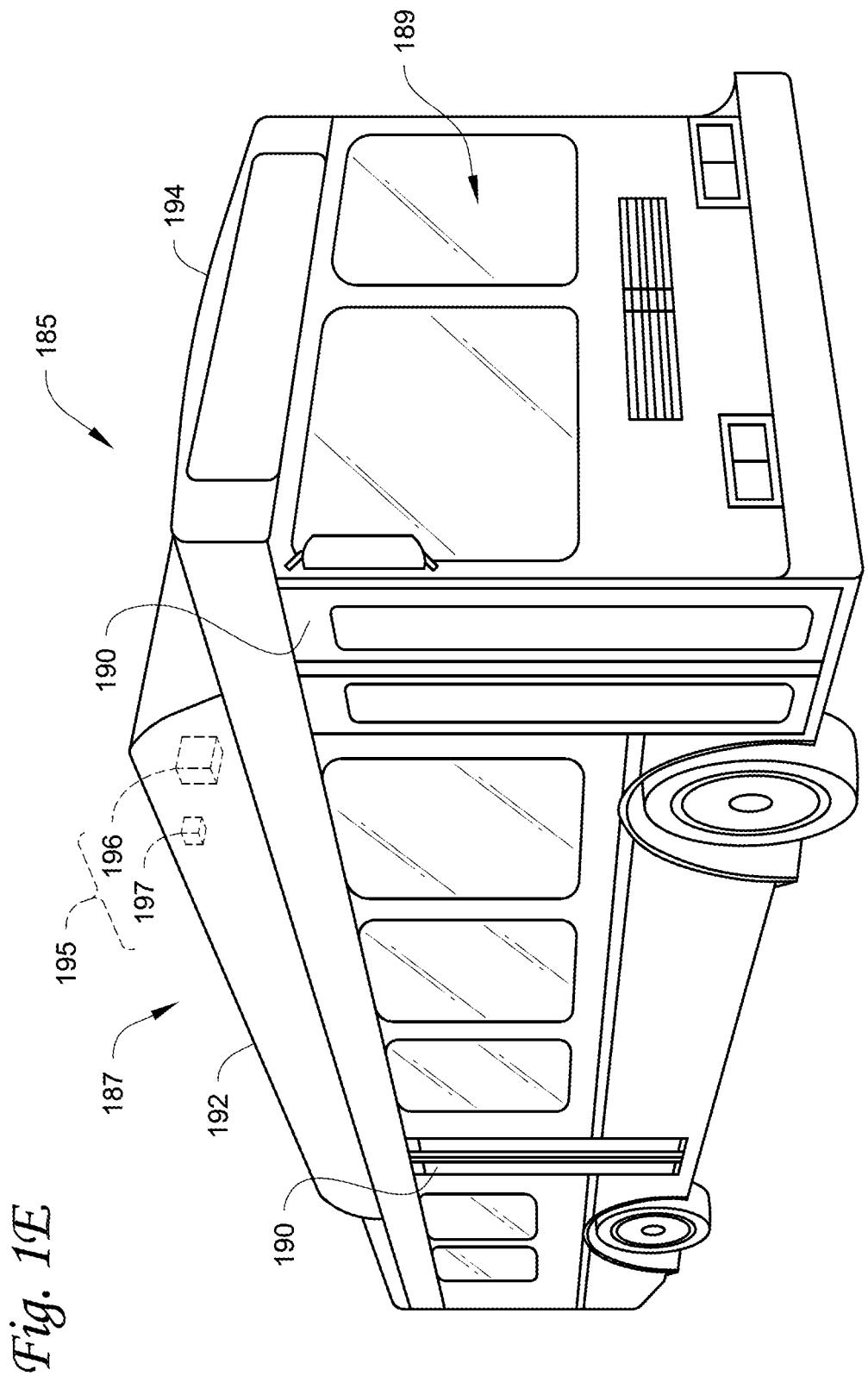
FIG. 1E illustrates a perspective view of a mass-transit vehicle including a transport climate control system, according to one embodiment.

FIG. 1E is a perspective view of a vehicle 185 including a transport climate control system 187, according to one embodiment. The vehicle 185 is a mass-transit bus that can carry passenger(s) (not shown) to one or more destinations. In other embodiments, the vehicle 185 can be a school bus, railway vehicle, subway car, or other commercial vehicle that carries passengers. The vehicle 185 includes a climate controlled space (e.g., passenger compartment) 189 supported that can accommodate a plurality of passengers. The vehicle 185 includes doors 190 that are positioned on a side of the vehicle 185. In the embodiment shown in FIG. 1E, a first door 190 is located adjacent to a forward end of the vehicle 185, and a second door 190 is positioned towards a rearward end of the vehicle 185. Each door 190 is movable between an open position and a closed position to selectively allow access to the climate controlled space 189. The transport climate control system 187 includes a CCU 192 attached to a roof 194 of the vehicle 185.

The CCU 192 includes a climate control circuit (see FIG. 2) that connects, for example, a compressor, a condenser, an evaporator and an expansion device to provide conditioned air within the climate controlled space 189. The transport climate control system 187 also includes a programmable climate controller 195 and one or more sensors (not shown) that are configured to measure one or more parameters of the transport climate control system 187 (e.g., an ambient temperature outside of the vehicle 185, a space temperature within the climate controlled space 189, an ambient humidity outside of the vehicle 185, a space humidity within the climate controlled space 189, etc.) and communicate parameter data to the climate controller 195. The climate controller 195 is configured to control operation of the transport climate control system 187 including components of the climate control circuit. The climate controller 195 may comprise a single integrated control unit 196 or may comprise a distributed network of climate controller elements 196, 197. The number of distributed control elements in a given network can depend upon the particular application of the principles described herein.

Figure 2:
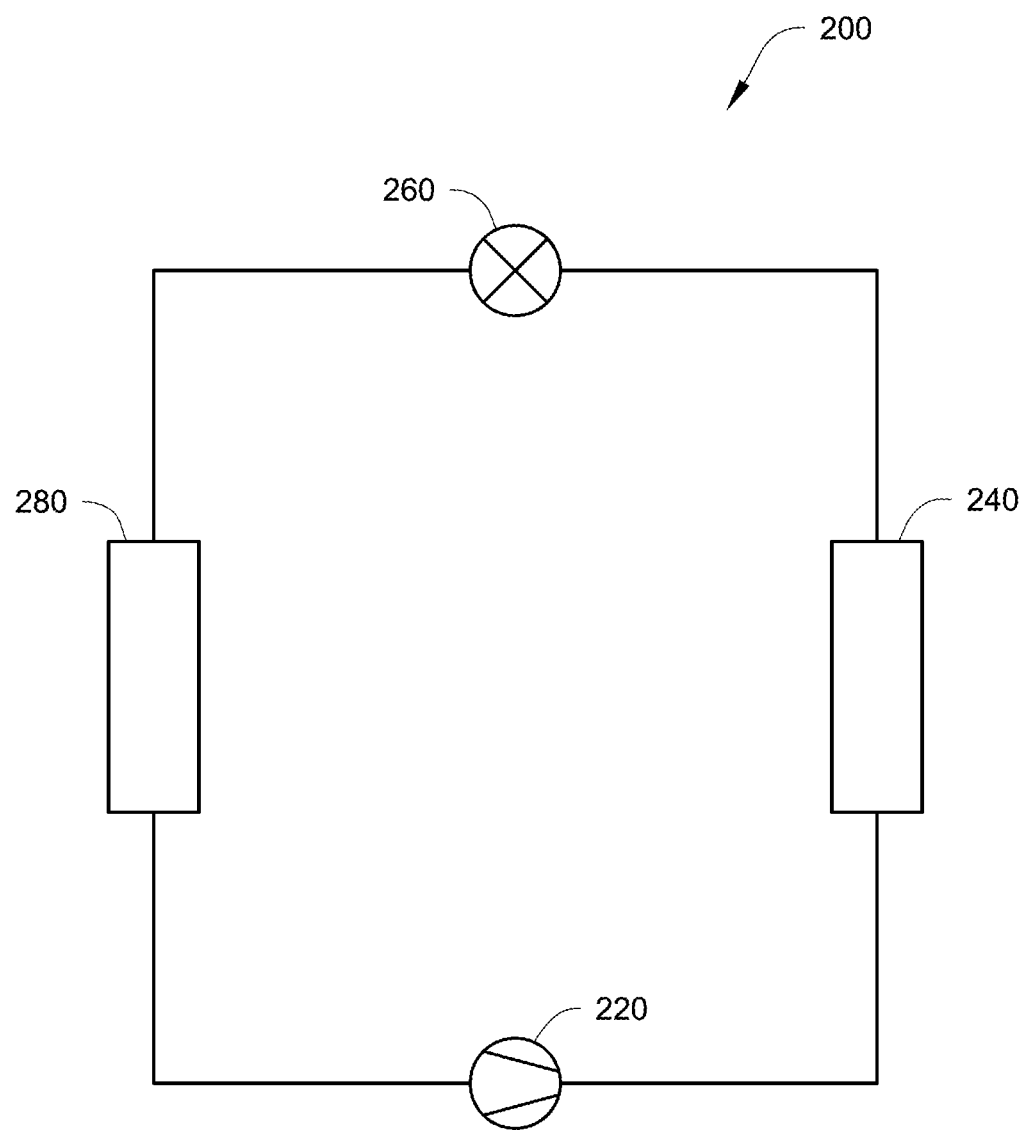
FIG. 2 is a schematic diagram of a climate control circuit, according to one embodiment.

FIG. 2 is a schematic diagram of a climate control circuit 200, according to one embodiment. The climate control circuit 200 can be used, for example, in the transport climate control systems 110, 132, 145, 162 and 187 (shown in FIGS. 1A-1E). The climate control circuit 200 generally includes a compressor 220, a condenser 240, an expansion device 260, and an evaporator 280. The climate control circuit 200 is an example and can be modified to include additional components. For example, in an embodiment, the climate control circuit 200 can include other components such as, but not limited to, an economizer heat exchanger, one or more flow control devices, a receiver tank, a dryer, a suction-liquid heat exchanger, one or more condenser blowers/fans, one or more evaporator blowers/fans, one or more sensors, a controller, or the like.

The climate control circuit 200 can generally be applied in a variety of systems used to control an environmental condition (e.g., temperature, humidity, air quality, or the like) in a space (generally referred to as a conditioned space). Examples of such systems include, but are not limited to, HVAC systems, transport climate control systems, or the like. In one embodiment, an HVAC system can be a rooftop unit or a heat pump air-conditioning unit.

The compressor 220, condenser 240, expansion device 260, and evaporator 280 are fluidly connected. In one embodiment, the climate control circuit 200 can be configured to be a cooling system (e.g., an air conditioning system) capable of operating in a cooling mode. In one embodiment, the climate control circuit 200 can be configured to be a heat pump system that can operate in both a cooling mode and a heating/defrost mode.

The climate control circuit 200 can operate according to generally known principles. The climate control circuit 200 can be configured to heat or cool a liquid process fluid (e.g., a heat transfer fluid or medium (e.g., a liquid such as, but not limited to, water or the like)), in which case the climate control circuit 200 may be generally representative of a liquid chiller system. The climate control circuit 200 can alternatively be configured to heat or cool a gaseous process fluid (e.g., a heat transfer medium or fluid (e.g., a gas such as, but not limited to, air or the like)), in which case the climate control circuit 200 may be generally representative of an air conditioner or heat pump.

In operation, the compressor 220 compresses a working fluid (e.g., a heat transfer fluid (e.g., refrigerant or the like)) from a relatively lower pressure gas to a relatively higher-pressure gas. The relatively higher-pressure gas is also at a relatively higher temperature, which is discharged from the compressor 220 and flows through the condenser 240. In accordance with generally known principles, the working fluid flows through the condenser 200 and rejects heat to the process fluid (e.g., water, air, etc.), thereby cooling the working fluid. The cooled working fluid, which is now in a liquid form, flows to the expansion device 260. The expansion device 260 reduces the pressure of the working fluid. As a result, a portion of the working fluid is converted to a gaseous form. The working fluid, which is now in a mixed liquid and gaseous form flows to the evaporator 280. The working fluid flows through the evaporator 280 and absorbs heat from the process fluid (e.g., a heat transfer medium (e.g., water, air, etc.)), heating the working fluid, and converting it to a gaseous form. The gaseous working fluid then returns to the compressor 220. The above-described process continues while the heat transfer circuit is operating, for example, in a cooling mode.

Figure 3:
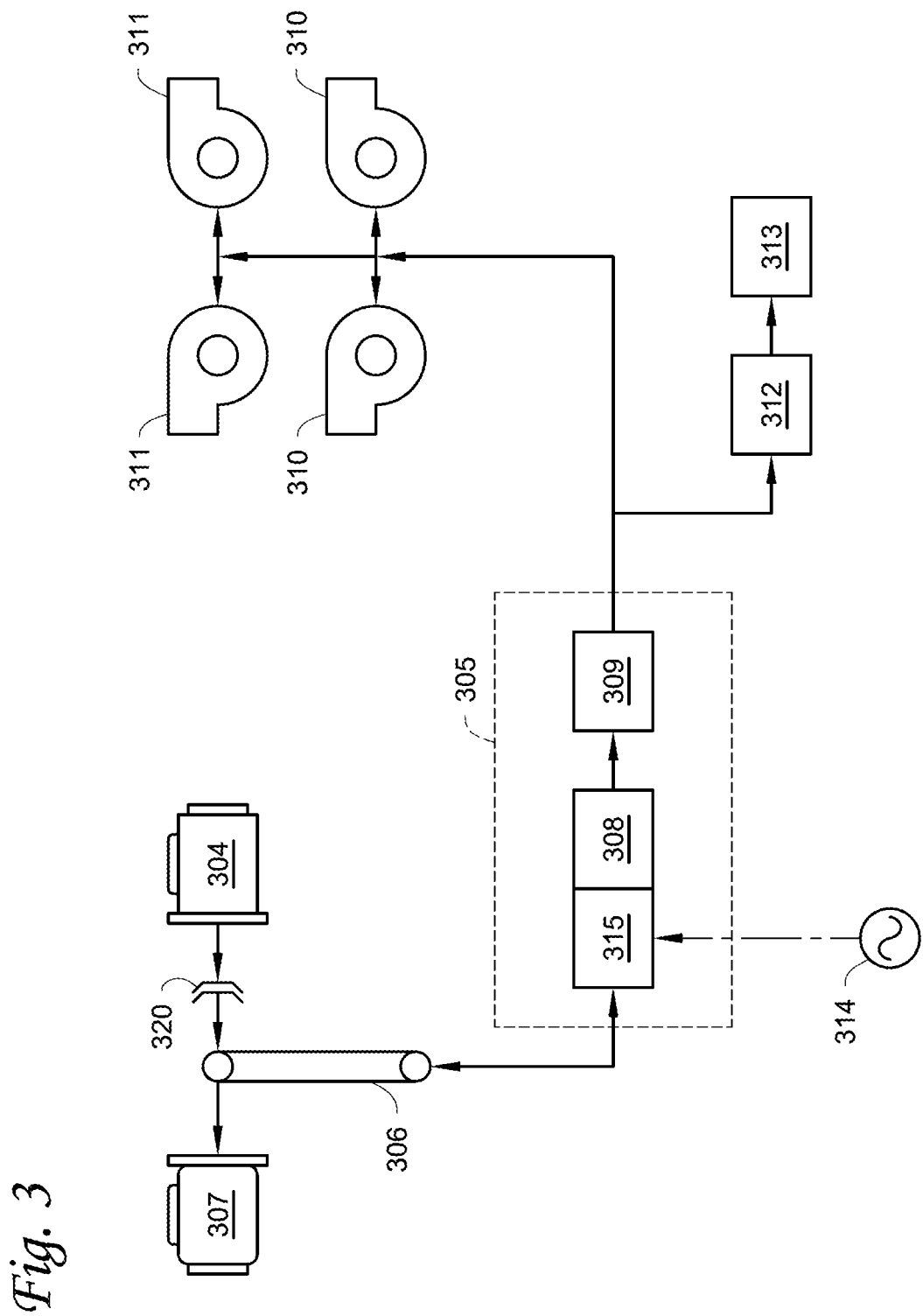
FIG. 3 is a schematic diagram of a climate control power system, according to one embodiment.

FIG. 3 is a schematic diagram of a climate control power system 300, according to one embodiment. It will be appreciated that the climate control power system 300 can be used to provide energy for powering the compressor 220 and at least one condenser fan associated with the condenser 240 and at least one evaporator fan associated with the evaporator 280 of the climate control circuit 200 of FIG. 2. The climate control power system 300 can also power any other components (e.g., vehicle tail lift charger, auxiliary lighting systems inside the climate controlled space, etc.) of a transport climate control system (e.g., the transport climate control systems 110, 132, 145, 162 and 187 shown in FIGS. 1A-1E).

The climate control power system 300 includes a compressor 307 (e.g., the compressor 220 shown in FIG. 2), a belt drive 306, a prime mover 304 and a clutch 320. The compressor 307 can be mechanically driven by the belt drive 306 or by the prime mover 304 via a clutch 320. The prime mover 304 can be an internal combustion engine (e.g., a diesel engine, a compression-ignition engine, etc.). In one embodiment, the compressor 307 can be directly mounted to the prime mover 304 via the clutch 320. In such embodiment, the prime mover 304 can be configured to, e.g., mechanically drive the compressor 307 via the clutch 320 when the clutch 320 is engaged (to the compressor 307 and the belt drive 306). When the clutch 320 does not engage the compressor 307 to the belt drive 306, the compressor 307 can be driven by a motor-generator-rectifier machine 305 via the belt drive 306.

The motor-generator-rectifier machine 305 includes a motor 315 (e.g., an AC motor winding), a generator 308 (e.g., a low voltage AC generator winding to generate electrical power when a shaft of the motor-generator-rectifier machine 305 is rotating) connected to the motor 315, and a rectifier 309 (e.g., an AC-DC rectifier) connected to the generator 308.

In one embodiment, when the clutch 320 is engaged (and thus the prime mover 304) with the compressor 307 and the belt drive 306, the motor-generator-rectifier machine 305 can be powered and/or driven by the prime mover 304 via the belt drive 306, to provide power. In such embodiment, the compressor 307 can be directly driven by the prime mover 304 via the clutch 320.

In one embodiment, the motor-generator-rectifier machine 305 can connect to an AC power source 314. In such embodiment, the clutch 320 (and thus the prime mover 304) is disengaged from the compressor 307 and the belt drive 306. The AC power source 314 can be, for example, a shore/utility power source. The AC power source 314 can be a three-phase AC power source. The AC power source 314 can provide power to the motor 315 of the motor-generator-rectifier machine 305 to energize the motor 315. The motor 315 can be an electric motor. In such embodiment, the motor 315 is a standby motor, which serves as an alternate prime mover to provide power to the climate control power system 300, for example, when the prime mover 304 is unavailable to provide power.

When the motor 315 is energized, the motor 315 can rotate a shaft (not shown) of the motor-generator-rectifier machine 305. It will be appreciated that the motor 315 and the generator 308 are on the same shaft. The shaft of the motor-generator-rectifier machine 305 can propel the generator 308 so that the generator 308 can generate AC power. In one embodiment, the generator 308 is a low voltage generator. The AC power generated by the generator 308 is distributed to the rectifier 309. In one embodiment, the rectifier 309 is an active rectifier. The rectifier 309 can convert the AC power generated by the generator 308, to e.g., a low voltage DC power. In one embodiment, the voltage of the converted low voltage DC power is 48 volts. When the motor 315 is energized, the motor 315 can also drive the compressor 307 via the belt drive 306.

The climate control power system 300 includes at least one condenser fan 310, at least one evaporator fan 311, and a DC to DC converter 312. In some embodiments, the at least one condenser fan 310 can be a variable speed fan. In some embodiments, the at least one condenser fan 310 can be a low voltage DC fan. In some embodiments, the at least one evaporator fan 311 can be a variable speed fan. In some embodiments, the at least one evaporator fan 311 can be a low voltage DC fan.

The converted low voltage DC power from the rectifier 309 is distributed to the at least one condenser fan 310, the at least one evaporator fan 311, and the DC to DC converter 312. In one embodiment, the DC to DC converter 312 is a buck converter that lowers the converted low voltage DC power from the rectifier 309, to a second low voltage DC power.

In one embodiment, the second low voltage DC power is distributed to a control system 313 to power and/or charge the control system 313. The control system 313 can include a controller, a rechargeable energy storage system (e.g., a battery), a battery charger, solenoid(s), and/or valve(s), etc. In one embodiment, the voltage of the second low voltage DC power is 12 volts.

In operation, in a running mode of the climate control power system 300, the prime mover 304 is engaged with the compressor 307 and the belt drive 306, via the clutch 320. In such mode, the prime mover 304 directly drives the compressor 307, which is directly mounted to the prime mover 304. The prime mover 304 connects to and drives the motor-generator-rectifier machine 305 via the belt drive 306, such that the generator 308 of the motor-generator-rectifier machine 305 can provide a low voltage AC power to the rectifier 309 of the motor-generator-rectifier machine 305. The rectifier 309 can convert the low voltage AC power to a low voltage DC power to drive the low voltage DC fans (the at least one condenser fan 310 and at least one evaporator fan 311) and to provide power to the DC to DC convertor 312. The DC to DC convertor 312 can convert the low voltage DC power from the rectifier 309 to a second low voltage DC voltage to power and/or charge the control system 313 (e.g., charging the battery of the control system 313, providing DC power to the solenoid(s) and valve(s) of the control system 313, etc.).

In operation, in a standby mode of the climate control power system 300, the prime mover 304 is disengaged with the compressor 307 and the belt drive 306, via the clutch 320. The AC power source 314 can provide power to the climate control circuit 300 when connected to the motor 315 to energize the motor 315. When the motor 315 is energized, the motor 315 can rotate the shaft of the motor-generator-rectifier machine 315, which can propel the generator 308 to provide a low voltage AC power to the rectifier 309 which in turn can convert the low voltage AC power to a low voltage DC power to drive the low voltage DC fans (the at least one condenser fan 310 and at least one evaporator fan 311) and to provide power to the DC to DC convertor 312. The DC to DC convertor 312 can convert the low voltage DC power from the rectifier 309 to a second low voltage DC power to power and/or charge the control system 313 (e.g., charging the battery of the control system 313, providing DC power to the solenoid(s) and valve(s) of the control system 313, etc.). When the motor 315 is energized, the motor 315 can also drive the compressor 307 via the belt drive 306.

Embodiments disclosed herein allow each of the at least one condenser fan 310 and the at least one evaporator fan 311 to be individually and independently powered and controlled (e.g., by the controller). As such, the speed of the at least one condenser fan 310 and/or the speed of the at least one evaporator fan 311 can be controlled independent of the speed of the prime mover 304 and/or the speed of the generator 308.

In one embodiment, the at least one condenser fan 310 and/or the at least one evaporator fan 311 can be fully variable speed fans. In such embodiment, the at least one condenser fan 310 and/or the at least one evaporator fan 311 can have more than two speeds. It will be appreciated that a two-speed fan refers to a fan with a high speed and a low speed corresponding to a two-speed engine/generator that drives the fan. The fans (310 and/or 311) can be configured to run continuously and/or in a cycle-sentry mode. The speed of the fans (310 and/or 311) can be controlled (e.g., by the controller) to optimize at each point around fuel economy. For example, the speed of the fans (310 and/or 311) can be controlled based on a curve fit which is based on e.g., prime mover (e.g., engine) speed, ambient temperature, and/or box temperature (e.g., temperature of the climate controlled space), during operations such as pulldown. In one embodiment, the curve fit of the fan speed (a curve used by the controller to determine the speed of the fan) can be based on the speed of the compressor, ambient temperature, and/or box temperature. In such embodiment, the speed of the fans (310 and/or 311) can be controlled based on the load of the transport climate control system. In one embodiment, the curve fit of the fan speed (a curve used by the controller to determine the speed of the fan) can be used when, e.g., an AC power source (such as utility/shore power) is used and the prime mover is disengaged.

It will be appreciated that in one embodiment, to generate power for the transport climate control system, technology from automotive Hybrid Electric Vehicles can be used. For example, an automotive belt-driven-starter-generator (BSG) can be used in place of the motor-generator-rectifier machine 305 of FIG. 3 to be belt driven, or be directly coupled to the motor 315 to provide a low voltage DC power to the low voltage DC fans (e.g., the at least one condenser fan 310 and at least one evaporator fan 311) and to the DC to DC converter 312. It will also be appreciated that in one embodiment, to generate power for the low voltage DC fans (e.g., the at least one condenser fan 310 and at least one evaporator fan 311) and the DC to DC converter 312, the motor 315 can be directly coupled to a high voltage generator (to replace the low voltage generator 308), where the generator can provide high voltage AC power (e.g., 400 VAC, 50 Hz). Alternately, the high voltage generator can be a belt driven device providing high voltage AC. The high voltage AC generated by either of the two high voltage generator configurations can then be input to an AC to DC converter, that can provide the required DC power levels for the at least one condenser fan 310, the at least one evaporator fan 311, and/or the control system 313. In some embodiments, AC (e.g., high voltage AC) powered condenser and/or evaporator fans can be used in place of the at least one condenser fan 310 and the at least one evaporator fan 311. In such embodiments, the condenser and/or evaporator fans can be powered by a high voltage generator and/or by the prime mover 304.

ASPECTS

It is to be appreciated that any of aspects 1-11 can be combined with any of aspects 12-15.

Aspect 1. A transport climate control system, the transport climate control system comprising:
    a compressor;
    a motor-generator-rectifier machine;
    a belt drive connected to the motor-generator-rectifier machine and the compressor;
    at least one condenser fan;
    at least one evaporator fan; and
    a DC to DC converter,
    wherein the motor-generator-rectifier machine connects to the at least one condenser fan, the at least one evaporator fan, and the DC to DC converter,
    wherein the motor-generator-rectifier machine includes:
    a motor;
    a low voltage generator connected to the motor; and
    a rectifier connected to the low voltage generator,
    wherein the motor-generator-rectifier machine is configured to provide a first low voltage DC power to the at least one condenser fan, the at least one evaporator fan, and the DC to DC converter, and
    the DC to DC converter is configured to convert the first low voltage DC power to a second low voltage DC power that is different from the first low voltage DC power.

Aspect 2. The transport climate control system according to aspect 1, wherein the compressor is configured to be directly driven by a prime mover via a clutch.

Aspect 3. The transport climate control system according to aspect 1 or aspect 2, wherein the motor-generator-rectifier machine is configured to be driven by a prime mover via the belt drive.

Aspect 4. The transport climate control system according to any one of aspects 1-3, wherein the prime mover is a diesel engine.

Aspect 5. The transport climate control system according to any one of aspects 1-4, wherein the compressor is configured to be driven by the motor via the belt drive.

Aspect 6. The transport climate control system according to aspect 1, wherein the motor is configured to be driven by an AC power source.

Aspect 7. The transport climate control system according to aspect 6, wherein the motor is configured to rotate a shaft of the motor-generator-rectifier machine, and the shaft is configured to propel the low voltage generator to provide power.

Aspect 8. The transport climate control system according to any one of aspects 1-7, wherein the DC to DC converter is a buck converter that lowers the first low voltage DC power to the second low voltage DC power.

Aspect 9. The transport climate control system according to any one of aspects 1-8, wherein the at least one condenser fan and/or the at least one evaporator fan are variable speed fans.

Aspect 10. The transport climate control system according to any one of aspects 1-9, wherein a speed of the at least one condenser fan and/or a speed of the at least one evaporator fan are controlled independent of a speed of a prime mover and/or a speed of the low voltage generator.

Aspect 11. The transport climate control system according to any one of aspects 1-10, wherein the first low voltage DC power is 48 volts and the second low voltage DC power is 12 volts.

Aspect 12. A method for distributing power for a transport climate control system, the method comprising:

distributing power to a motor-generator-rectifier machine, the motor-generator-rectifier machine including a motor, a low voltage generator, and a rectifier, the motor-generator-rectifier machine generating a first low voltage DC power to drive at least one condenser fan, at least one evaporator fan, and a DC to DC converter, the DC to DC converter converting the first low voltage DC power to a second low voltage DC power that is different from the first low voltage DC power.

Aspect 13. The method according to aspect 12, further comprising:

a prime mover directly driving a compressor of the transport climate control system; and the prime mover driving the motor-generator-rectifier machine via a belt drive.

Aspect 14. The method according to aspect 12, further comprising:

an AC power source supplying power to the motor of the motor-generator-rectifier machine;

the motor rotating a shaft of the motor-generator-rectifier machine; and the shaft propelling the low voltage generator to provide power.

Aspect 15. The method of any one of aspects 12-14, further comprising:

controlling a speed of the at least one condenser fan and a speed of the at least one evaporator fan independent of a speed of a prime mover or a speed of the low voltage generator.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A transport climate control system, the transport climate control system comprising:
    a compressor;
    a motor-generator-rectifier machine;
    a belt drive connected to the motor-generator-rectifier machine and the compressor;
    at least one condenser fan;
    at least one evaporator fan; and
    a DC to DC converter,
    wherein the motor-generator-rectifier machine connects to the at least one condenser fan, the at least one evaporator fan, and the DC to DC converter,
    wherein the motor-generator-rectifier machine includes:
        an AC motor connected to the belt drive;
        an AC low voltage generator connected to the motor; and
        a rectifier connected to the low voltage generator, the low voltage generator being disposed between the motor and the rectifier,
    wherein the motor-generator-rectifier machine is configured to provide a first low voltage DC power to the at least one condenser fan, the at least one evaporator fan, and the DC to DC converter, and
    the DC to DC converter is configured to convert the first low voltage DC power to a second low voltage DC power that is different from the first low voltage DC power.

2. The transport climate control system according to claim 1, wherein the compressor is configured to be directly driven by a prime mover via a clutch.

3. The transport climate control system according to claim 2, wherein the prime mover is a diesel engine.

4. The transport climate control system according to claim 1, wherein the motor-generator-rectifier machine is configured to be driven by a prime mover via the belt drive.

5. The transport climate control system according to claim 1, wherein the compressor is configured to be driven by the motor via the belt drive.

6. The transport climate control system according to claim 1, wherein the motor is configured to be driven by an AC power source.

7. The transport climate control system according to claim 6, wherein the motor is configured to rotate a shaft of the motor-generator-rectifier machine, and
    the shaft is configured to propel the low voltage generator to provide power.

8. The transport climate control system according to claim 1, wherein the DC to DC converter is a buck converter that lowers the first low voltage DC power to the second low voltage DC power.

9. The transport climate control system according to claim 1, wherein the at least one condenser fan and/or the at least one evaporator fan are variable speed fans.

10. The transport climate control system according to claim 1, wherein a speed of the at least one condenser fan and/or a speed of the at least one evaporator fan are controlled independent of a speed of a prime mover and/or a speed of the low voltage generator.

11. The transport climate control system according to claim 1, wherein the first low voltage DC power is 48 volts and the second low voltage DC power is 12 volts.

12. The transport climate control system according to claim 1, wherein the motor and the low voltage generator are on a same shaft of the motor-generator-rectifier machine, the shaft is configured to propel the low voltage generator to generate AC power to the rectifier.

13. The transport climate control system according to claim 1, wherein the belt drive is configured to directly connect to the motor of the motor-generator-rectifier machine and the compressor, the motor directly connects to the low voltage generator, the low voltage generator directly connects to the rectifier, and the rectifier directly connects to the at least one condenser fan and the at least one evaporator fan.

14. A method for distributing power for a transport climate control system, the method comprising:
    distributing power to a motor-generator-rectifier machine, the motor-generator-rectifier machine including an AC motor connected to a belt drive, an AC low voltage generator connected to the motor, and a rectifier connected to the low voltage generator, the low voltage generator being disposed between the motor and the rectifier, the motor-generator-rectifier machine generating a first low voltage DC power to drive at least one condenser fan, at least one evaporator fan, and a DC to DC converter, the DC to DC converter converting the first low voltage DC power to a second low voltage DC power that is different from the first low voltage DC power.

15. The method according to claim 14, further comprising:

a prime mover directly driving a compressor of the transport climate control system; and the prime mover driving the motor-generator-rectifier machine via the belt drive.

16. The method according to claim 14, further comprising:

an AC power source supplying power to the motor of the motor-generator-rectifier machine;

the motor rotating a shaft of the motor-generator-rectifier machine; and the shaft propelling the low voltage generator to provide power.

17. The method of claim 14, further comprising:

controlling a speed of the at least one condenser fan and a speed of the at least one evaporator fan independent of a speed of a prime mover or a speed of the low voltage generator.

18. The method of claim 14, wherein the motor and the low voltage generator are on a same shaft of the motor-generator-rectifier machine, the shaft is configured to propel the low voltage generator to generate AC power to the rectifier.

19. The method of claim 14, wherein the belt drive is configured to directly connect to the motor of the motor-generator-rectifier machine and the compressor, the motor directly connects to the low voltage generator, the low voltage generator directly connects to the rectifier, and the rectifier directly connects to the at least one condenser fan and the at least one evaporator fan.

* * * * *